United States Patent
Ramamurthy

(10) Patent No.: US 10,178,643 B1
(45) Date of Patent: Jan. 8, 2019

(54) SIGNAL POWER PATTERN-BASED LOCATION DETECTION AND CELL PLACEMENT

(71) Applicant: Verizon Patent and Licensing Inc., Arlington, VA (US)

(72) Inventor: Suryanarayanan Ramamurthy, Bengaluru (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/032,444

(22) Filed: Jul. 11, 2018

Related U.S. Application Data

(62) Division of application No. 15/675,860, filed on Aug. 14, 2017, now Pat. No. 10,051,594.

(51) Int. Cl.
  *H04W 64/00* (2009.01)
  *H04B 17/318* (2015.01)
  *G06N 99/00* (2010.01)
  *H04W 16/18* (2009.01)

(52) U.S. Cl.
  CPC .......... *H04W 64/00* (2013.01); *G06N 99/005* (2013.01); *H04B 17/318* (2015.01); *H04W 16/18* (2013.01)

(58) Field of Classification Search
  CPC .......................... H04W 64/003; H04W 64/006
  USPC .......................................... 455/456.1–456.6
  See application file for complete search history.

(56) References Cited

U.S. PATENT DOCUMENTS

| 5,602,903 | A  | * | 2/1997  | LeBlanc   | G01S 1/045   |
|           |    |   |         |           | 342/450      |
| 7,620,404 | B2 | * | 11/2009 | Chesnais  | H04W 4/02    |
|           |    |   |         |           | 455/414.2    |
| 9,485,627 | B2 | * | 11/2016 | David     | H04W 4/029   |
| 2010/0159871 | A1 | * | 6/2010 | Tester    | H04W 4/029   |
|           |    |   |         |           | 455/404.2    |
| 2012/0150490 | A1 | * | 6/2012 | Oyabu    | G06Q 10/06   |
|           |    |   |         |           | 702/179      |
| 2013/0115961 | A1 | * | 5/2013 | Shibayama | H04W 16/18   |
|           |    |   |         |           | 455/446      |
| 2013/0137459 | A1 | * | 5/2013 | Kobayashi | G06Q 30/0201 |
|           |    |   |         |           | 455/456.1    |
| 2015/0341895 | A1 | * | 11/2015 | Zhang    | G01S 5/021   |
|           |    |   |         |           | 455/456.1    |
| 2016/0044453 | A1 | * | 2/2016 | Chou     | H04L 12/6418 |
|           |    |   |         |           | 455/456.1    |

\* cited by examiner

*Primary Examiner* — Joshua Schwartz

(57) ABSTRACT

Systems and methods identify placement areas for small cells in a macro cell network environment. A network device collects user equipment (UE) received signal strength measurements for wireless access stations concurrently visible to one or more UE devices and designates signature areas based on groupings of the concurrently visible wireless access stations. The network device identifies time intervals with high RAN usage; extracts, from network data for the identified time intervals, traffic data for each signature area over incremental periods and a number of concurrent UEs for each signature area over the incremental periods. The network device ranks the signature areas based on the extracted uplink traffic and the extracted number of concurrent UEs; and selects a target signature area for small cell placement from the ranked signature areas.

20 Claims, 10 Drawing Sheets

520 →

610

Signature Area 5: eNB2, eNB3

| Date 611 | Time 612 | Location Coordinates 613 | RSRP2 615 | RSRP3 616 |
|---|---|---|---|---|
| 07-07-2017 | 13:02:49 | +32.30642, -122.61458 | 87 | 56 |
| 07-07-2017 | 15:52:32 | +32.30649, -122.61448 | 85 | 57 |

618 ⎬

• • •

620

Signature Area 7: eNB1, eNB2, eNB3

| Date 611 | Time 612 | Location Coordinates 613 | RSRP1 614 | RSRP2 615 | RSRP3 616 |
|---|---|---|---|---|---|
| 07-07-2017 | 08:02:41 | +32.34821, -122.61467 | 43 | 42 | 63 |
| 07-07-2017 | 08:03:41 | +32.34851, -122.61475 | 41 | 45 | 61 |

SIGNAL POWER PATTERN-BASED LOCATION DETECTION AND CELL PLACEMENT

CROSS REFERENCE TO RELATED APPLICATION

This application is a divisional of U.S. patent application Ser. No. 15/675,860 filed on Aug. 14, 2017, the disclosure of which is hereby incorporated herein by reference in its entirety.

BACKGROUND

Mobile communication devices connect to an access network via a base station. A base station may include a radio frequency (RF) transceiver or a Radio Access Network (RAN) configured to receive wireless signals from a mobile communication device and to transmit wireless signals to the mobile communication device. The mobile communication devices collect signal strength measurements from base station signals and RANs, such as a downlink Reference Signal Receive Power (RSRP) measurements, which may be used for cell selection, reselection, and handover procedures. Network service providers may seek to maximize the value of base stations and other network components by optimizing use of existing RF resources, such as base station components.

BRIEF DESCRIPTION OF THE DRAWINGS

FIG. 6 is a diagram illustrating exemplary signature data of FIG. 5, according to an implementation described herein;

DETAILED DESCRIPTION OF PREFERRED EMBODIMENTS

Figure 1:
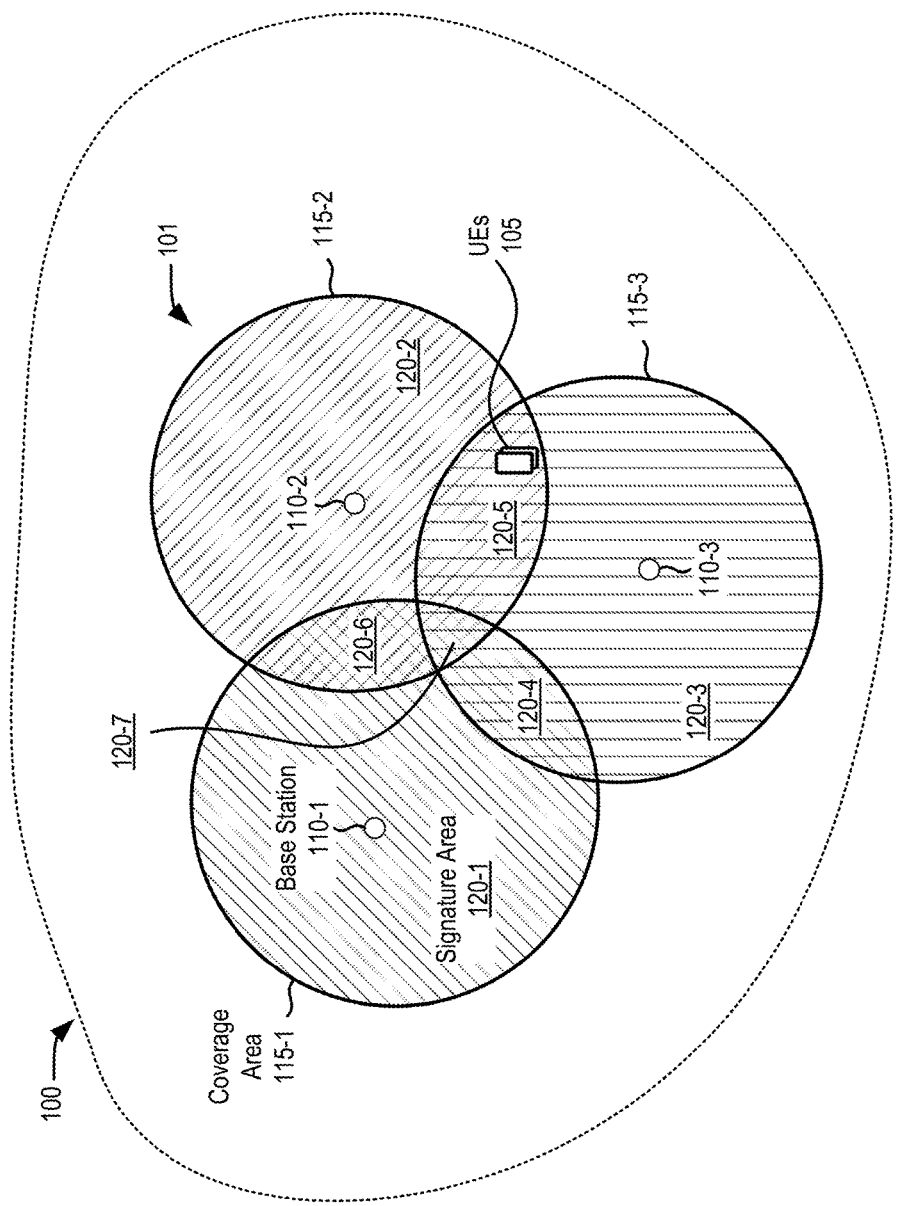
FIG. 1 is a diagram illustrating exemplary coverage areas of a cluster of base stations according to an implementation described herein.

The following detailed description refers to the accompanying drawings. The same reference numbers in different drawings may identify the same or similar elements.

Implementations described herein relate to determining the location of user equipment (UE) within a relatively fine grid without explicitly calling the UE's location algorithm. Implementations described herein further relate to application of these location techniques to identify placement for small cells in a macro cell network environment. Small cells (e.g., picocells, femtocells, or microcells), in contrast with traditional base stations or macro cells, use small base stations to locally augment capacity or rectify coverage gaps in a radio access network (RAN).

Currently, methods are available that use calibration points between a UE and a base station (e.g., an eNodeB) to do radio frequency (RF) pattern matching. However, these methods ignore the complete set of base stations that the UE sees at a given point in time. Also, any calibration points from such methods result in a static set of data to approximate the distance between an eNB and a UE. Further, the approximated distances between the UE and multiple base stations (from current methods) has to be used to triangulate the location, which results in further increase of error and may not be effective.

For coverage related scenarios, existing practices for small cell placement may include drive testing to identify RF coverage and decisions to best place small cells where coverage gaps are detected. Other methods may include simply identifying buildings with large indoor spaces and/or basements where macro cell coverage cannot effectively radiate. For capacity related scenarios, adding more macro cells may not be effective as it may add RF interference and, hence, hinder signal quality to UEs. Small cells may be a more effective capacity solution than adding more macro cells, as small cells provide a small coverage area, thereby minimizing RF interference. Currently, small cells are placed ad hoc at perceived high traffic spots to aid in capacity augmentation. Such haphazard placement may not be an optimal solution, since it involves trial and error and leads to multiple small cells to be placed within a macro cell.

In contrast, implementations described herein provide a faster algorithm to generate UE location information and more accurately recommend small cell placement locations. The embodiments described herein use signature areas and the availability of large amounts of actual data to enhance location accuracy and identify a location, rather than merely using a small set of calibrated data. The use of signature areas and clusters described further herein is environment and path-loss-information agnostic. Furthermore, no Customer Proprietary Network Information (CPNI) is exposed, as only the list of visible base stations, RSRP values, and position is required once cooperating UEs have provided the initial signature area definitions.

FIG. 1 is a diagram illustrating an exemplary geographic area 100 including a group 101 of base stations according to an implementation described herein. As shown in FIG. 1, group 101 may include individual cellular base stations 110-1 through 110-3 (also referred to herein collectively as base stations 110 or individually as base station 110) with corresponding RAN coverage areas 115-1 through 115-3 (referred to herein collectively as coverage areas 115 or individually as coverage area 115). In some implementations, base stations 110 may correspond to a Long Term Evolution (LTE) eNodeB (eNB) or another type of base station. Base stations 110 may enable user equipment (UE) devices 105 (also referred to herein as "UE 105"), such as mobile communication devices, located within coverage areas 115 to communicate with base stations 110 via wireless signals. A service provider may deploy hundreds or thousands of base stations 110 in a wireless network.

According to implementations described herein, coverage areas 115 of base stations 110 may be arranged into logical groups of overlapping coverage areas where signals from multiple base stations 110 can be simultaneously detected (e.g., with different relative signal strengths) by a UE 105. These areas of overlapping coverage are referred to herein as signature areas 120 or more simply "signatures."

In the example of FIG. 1, signals from base stations 110-1, 110-2 and 110-3 may result in signature areas 120-1 through 120-7. More particularly, signature area 120-1 may include an area where a UE 105 may detect signals only from base station 110-1; signature area 120-2 may include an area where a UE 105 may detect signals only from base station 110-2; and signature area 120-3 may include an area where a UE 105 may detect signals only from base station 110-3. Signature areas 120-4 through 120-7 may include signals from multiple base stations 110. Thus, signature area 120-4 may include an area where a UE 105 may detect signals from base stations 110-1 and 110-3; signature area 120-5 may include an area where a UE 105 may detect signals from base stations 110-2 and 110-3; signature area 120-6 may include an area where a UE 105 may detect signals from base stations 110-1 and 110-2; and signature area 120-7 may include an area where a UE 105 may detect signals from each of base stations 110-1, 110-2, and 110-3. The number and arrangement of base stations 110 in FIG. 1 is shown for simplicity. In practice, geographic area 100 may include numerous base stations with different and more complex signature areas 120.

According to an implementation, a signature area 120 may be learned through reports from cooperating UEs 105. For example, UEs 105 that opt in (e.g., agree to cooperate) may report location coordinates (e.g., global positioning system (GPS), assisted GPS, etc.) and received signal strength measurements (such as Reference Signal Receive Power (RSRP) measurements) from visible (or detectable) base stations 110 seen at an instance of time. The UE location data and received signal strength measurements can be used to define signature areas 120 based on the detected base stations 110 associated with each reported location. That is, all location data points where a visible set of base stations 110 is the same are grouped together as a signature area 120. Clustering algorithms can be used for each signature area 120 to identify location clusters based on the observed received signal strength measurements. For each location cluster, a position estimate (e.g., within the corresponding signature area 120) may be defined. In one implementation, location clusters may be updated periodically.

Once signature areas 120 and the corresponding clusters have been defined, a UE 105 (e.g., any UE) may report a set of visible base stations 110 along with their corresponding received signal strength measurements. The set of visible base stations 110 can be used to identify the signature area 120 for UE 105 and then identify the location cluster most closely corresponding to the signal strength measurements received from UE 105. Location information calculated for that cluster may be assumed as the approximate position of UE 105. In FIG. 1, for example, UE 105 is located within signature area 120-5, indicating UE 105 would report RSRP measurements for base stations 110-2 and 110-3. As described further herein, the location cluster estimating the location of UE 105 may be determined by matching the reported RSRP values to values for stored clusters associated with signature area 120-5.

Signature areas 120 may also be used to identify placement for small cells in a macro cell network environment. A process for identifying placement for small cell devices may apply signature areas 120 (based on received signal strength measurement reports from UEs 105) combined with downlink (DL) and uplink (UL) traffic data provided by base stations 110 (e.g., as part of Call Detail Records (CDRs)) and data throughput measurements.

Figure 2:
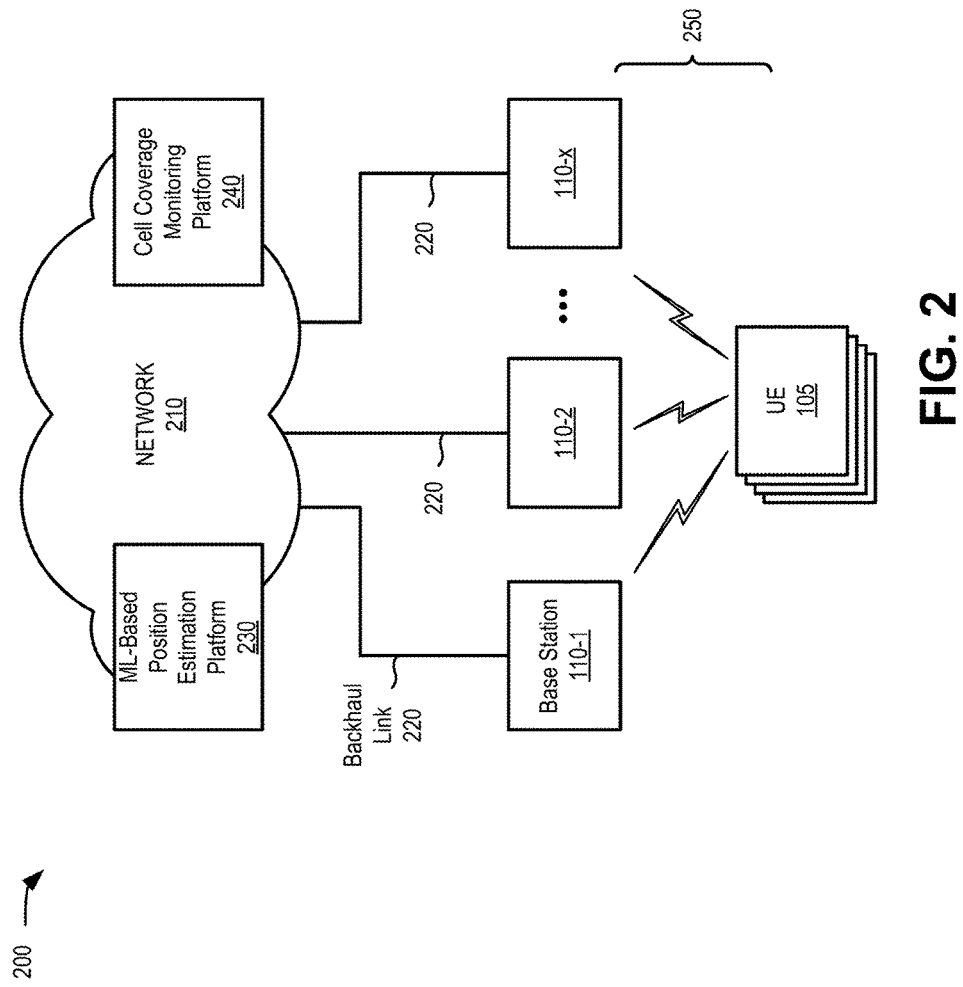
FIG. 2 is a diagram illustrating an exemplary network environment according to an implementation described herein.

FIG. 2 a diagram illustrating an exemplary network environment 200 associated with geographic environment 100 of FIG. 1. As shown in FIG. 2, network environment 200 may include UEs 105, base stations 110, a network 210, backhaul links 220 (referred to herein collectively as links 120 or individually as link 120), a machine learning (ML)-based position estimation platform 230, a cell coverage monitoring platform 240, and a RAN 250.

UE 105 may include any mobile communication device configured to communicate with a base station (e.g., base station 110) via wireless signals. For example, UE 105 may include a portable communication device (e.g., a mobile phone, a smart phone, a GPS device, and/or another type of wireless device); a telephone terminal; a personal computer or workstation; a server device; a laptop, tablet, or another type of portable computer; a media playing device; a portable gaming system; a machine-type communication (MTC) device; an Internet-of-Things device; and/or any type of mobile device with wireless communication capability.

Base station 110 may include a device that handles wireless transmissions to and from UE 105 to provide access to and from network 210. Base station 110 may include antennas and related transceiver circuitry for connecting to UE 105 over a wireless access network. For example, base station 110 may include a wireless access station, such as an eNodeB (e.g., for Third Generation Partnership Project (3GPP) LTE or 4G network standards), a next generation NodeB (e.g., for 3GPP 5G network standards), a Node B in a UMTS, a base transceiver station (BTS) in a Global System for Mobile Communications (GSM) system, a cell tower, etc. A collection of base stations 110 may form RAN 250 to provide for wireless access between UEs 105 and network 210 over a contiguous area. In one particular implementation, base station 110 may utilize LTE standards operating in a 700 MHz frequency band.

Network 210 may include one or more circuit-switched networks and/or packet-switched networks. For example, network 210 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Base stations 110 may connect to network 210 via backhaul links 220. According to an implementation, backhaul link 220 may include a standardized interface for RSRP pattern-based location detection.

ML-based position estimation platform 230 may include one or more network devices or computing devices. ML-based position estimation platform 230 may be implemented as a distributed component. Generally, ML-based position estimation platform 230 may collect observed data, such as location data, from cooperating UEs 105 to determine signature areas and clusters within signature areas. When other UEs 105 provide a list of visible base stations and corresponding RSRP values, ML-based position estimation platform 230 may use the previously-determined signature areas and clusters to estimate the location of the other UEs 105. ML-based position estimation platform 230 is described further, for example, in connection with FIGS. 5-7.

Cell coverage monitoring platform 240 may include one or more network devices or computing devices. Cell coverage monitoring platform 240 may be implemented as a distributed component. Cell coverage monitoring platform 240 may include a user interface for users (e.g., network managers) to provide queries, identify geographical boundaries, visualize coverage maps, etc. for identifying placement for small cells/devices in a macro network of base stations 110 (such as within base station group 101). As described further herein, cell coverage monitoring platform 240 may use signature areas to identify placement locations for small cells/devices in a macro network environment.

Although FIG. 2 shows exemplary components of network environment 200, in other implementations, network environment 200 may include fewer components, different components, differently-arranged components, or additional components than depicted in FIG. 2. Additionally or alternatively, one or more components of environment 200 may perform functions described as being performed by one or more other components of environment 200.

Figure 3:
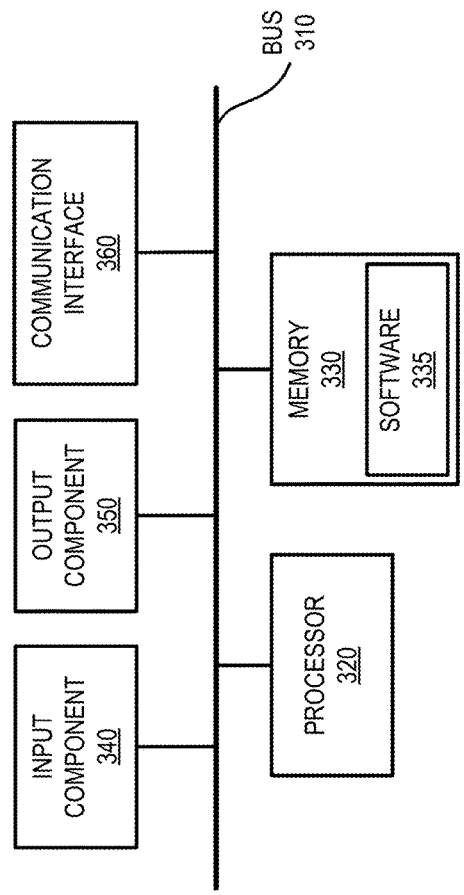
FIG. 3 is a diagram illustrating exemplary components of a device that may be included in the environment of FIG. 2.

FIG. 3 is a diagram illustrating exemplary components of a device 300. Device 300 may correspond, for example, to a component of UE 105, base station 110, ML-based position estimation platform 230, cell coverage monitoring platform 240, or another component of network environment 200. Device 300 may include a bus 310, a processor 320, a memory 330 with software 335, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 may also include firmware, middleware, microcode, hardware description language (HDL), and/or other form of instruction. By way of example, with respect to the network elements that include logic to provide RSRP pattern-based location detection, these network elements may be implemented to include software 335. Additionally, for example, UE 105 may include software 335 (e.g., an application to communicate with ML-based position estimation platform 230, etc.) to perform tasks as described herein.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to UE 105/base station 110, and receive RF signals over the air from base station 110/UE 105. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
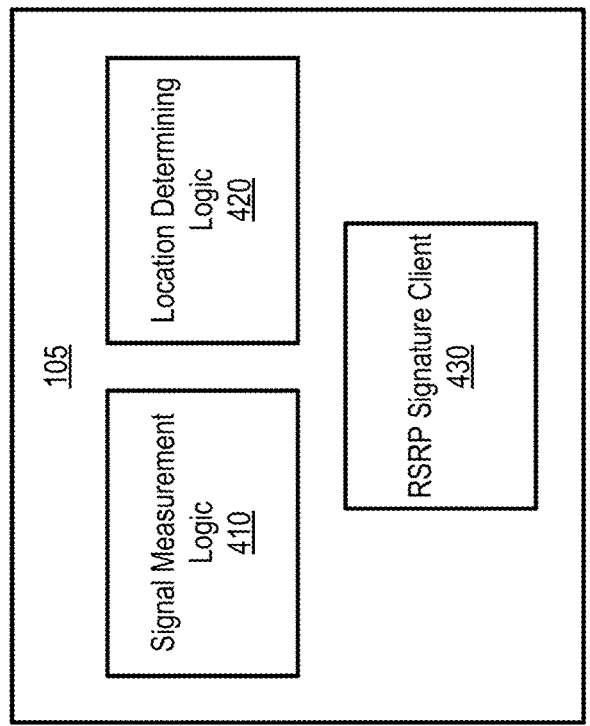
FIG. 4 is a diagram illustrating exemplary logical components of user equipment (UE) of FIG. 2, according to an implementation described herein.

FIG. 4 is a diagram illustrating exemplary logical components of UE 105, according to an implementation described herein. The logical components of UE 105 may be implemented, for example, via processor 320 executing instructions stored in memory 330. As shown in FIG. 4, UE 105 may include a signal measurement logic 410, a location determining logic 420, and an RSRP signature client 430.

Signal measurement logic 410 may collect received signal strength measurements, such as RSRP, Reference Signal Received Quality (RSRQ), and/or Received Signal Strength Indicator (RSSI) data for UE 105. For simplicity, received signal strength measurements described herein are referred to in the context of RSRP measurements. However, embodiments described herein may rely on RSRP, RSRQ, RSSI, and other observable signal quality measurements, alone or in combination. In one implementation, signal measurement logic 410 may collect RSRP data for each base station 110 that is visible to UE 105 at a point in time. RSRP measurements may be date- and time-stamped. Also, in some implementations for cooperating UEs 105, the RSRP measurements may include a frequency band, a channel number, a base station identifier, etc. In one implementation, UEs 105 may provide signal strength measurements to signal measurement logic 410 in batch files.

Location determining logic 420 may identify location coordinates for UE105. According to one implementation, location determining logic 420 may use well-known technologies and techniques to provide positioning services, such as, for example, satellite-based positioning (e.g., GPS, differential GPS (DGPS), GLONASS, etc.) or cellular-based positioning (e.g., triangulation, Enhanced Observed Time Difference (E-OTD), Uplink Time Difference of Arrival (U-TDOA), assisted GPS, etc.).

RSRP signature client 430 may include an application (e.g., software or a combination of hardware and software) configured to provide UE location coordinates (e.g., from signal measurement logic 410, location determining logic 420) and corresponding RSRP measurements of visible base stations 110 (e.g., from 410) seen by UE 105 at an instance of time. In one implementation, RSRP signature client 430 may include a user interface to solicit users of UEs 105 to opt in to report RSRP and location data. For example, a service provider (e.g., providing ML-based position estimation) may use the user interface of RSRP signature client 430 to offer an incentive (e.g., billing credit, reward points, coupons, etc.) for a user of UE 105 to provide UE location coordinates and corresponding RSRP measurements.

RSRP signature client 430 may compile the UE location coordinates and corresponding RSRP measurements from periodic intervals (e.g., one or more milliseconds, seconds) or when location changes are detected. RSRP signature client 430 may store (e.g., in memory 330) the compiled UE location coordinates and corresponding RSRP measurements. In one implementation, RSRP signature client 430 may provide the compiled UE location coordinates and corresponding RSRP measurements to ML-based position estimation platform 230 as a collection, such as a text file of measurements at multiple different times, upon request or at designated intervals (e.g., several seconds, minutes, hourly, etc.) to reduce network traffic and/or conserve UE resources.

For all UEs 105, regardless of whether a user has opted in to provide UE location coordinates and corresponding RSRP measurements, RSRP signature client 430 may report at any time a location signature, which may be defined as the set of base stations 110 visible to UE 105 along with their corresponding RSRP measurement at a given time. According to an implementation, the location signature for UE 105 may be provided without including CPNI, which may include information relating to the type, quantity, destination, technical configuration, location, and amount of use of telecommunications services by a UE 105. By contrast, implementations described herein do not rely on CPNI, as UE location determinations may rely on the list of visible base stations and RSRP values.

Although FIG. 4 shows exemplary logical components of UE 105, in other implementations, UE 105 may include fewer logical components, different logical components, or additional logical components than depicted in FIG. 4. Additionally or alternatively, one or more logical components of UE 105 may perform functions described as being performed by one or more other logical components.

Figure 5:
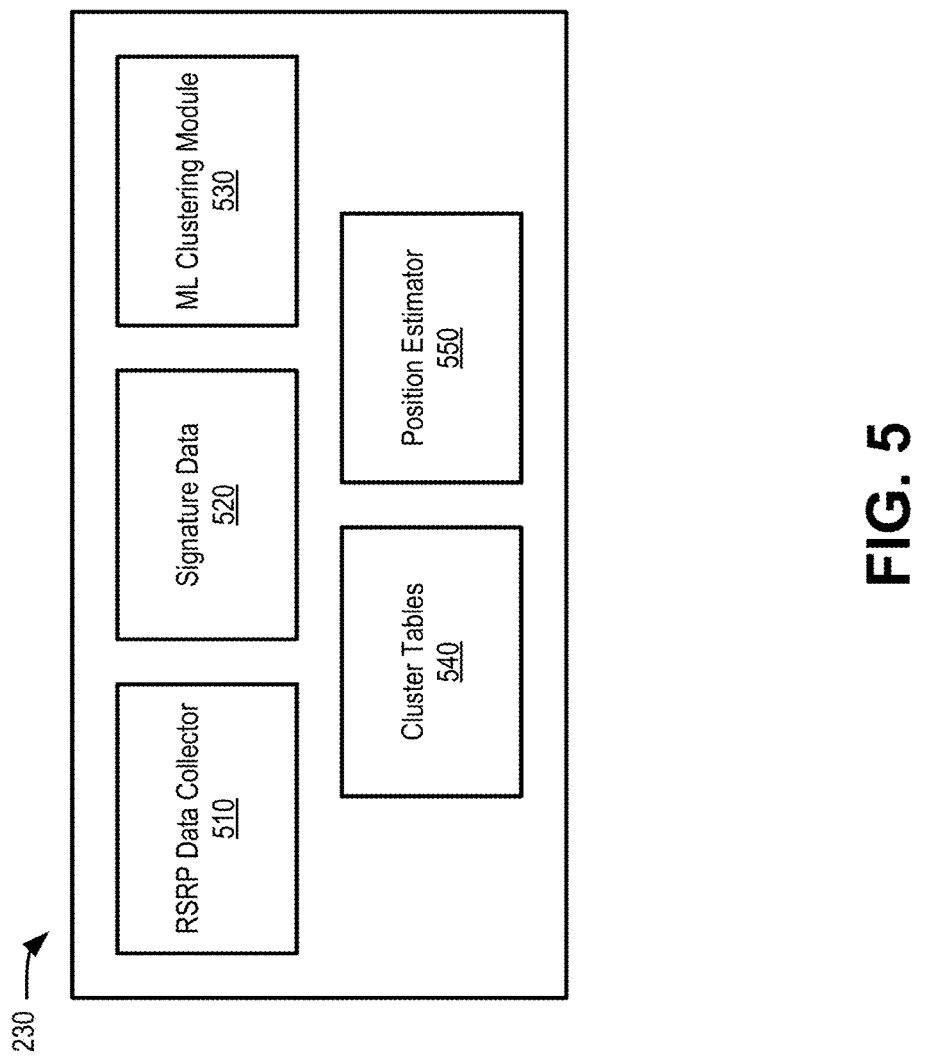
FIG. 5 is a diagram illustrating exemplary logical components of the machine-learning-based position estimation platform of FIG. 2.

FIG. 5 is a diagram illustrating exemplary logical components of ML-based position estimation platform 230, according to an implementation described herein. The logical components of ML-based position estimation platform 230 may be implemented, for example, via processor 320 executing instructions from memory 330. As shown in FIG. 5, ML-based position estimation platform 230 may include an RSRP data collector 510, signature data 520, a ML clustering module 530, cluster tables 540, and a position estimator 550.

RSRP data collector 510 may receive batch data from UEs 105 (e.g., RSRP signature client 430) and may sort the batch data into signature tables. The signature tables may be stored, for example, as signature data 520. In one implementation, batch data may be updated with a moving time window (e.g., one day, two days, five days, weekly, etc.). That is, older data outside the moving window may be removed and replaced with newer data to reflect possible changes in environmental conditions and the like over time.

Signature data 520 may include tables and/or data structures grouped by signature areas (e.g., signature areas 120). Generally, a separate table or data area may be used to represent each signature area. Each table may include entries with RSRP values and location values for each entry. FIG. 6 is a diagram illustrating an exemplary portion 600 of signature data with signature tables 610 and 620.

As shown in FIG. 6, each of tables 610 and 620 may correspond to a different signature area 120. Referring to the group 101 in FIG. 1, table 610 corresponds to signature area 120-5 with visible base stations 110-2 and 110-3. Similarly, table 620 corresponds to signature area 120-7 with visible base stations 110-1, 110-2, and 110-3. Each of tables 610 and 620 may include a date field 611, a time field 612, a location coordinates field 613, and an RSRP measurement field for each base station in the corresponding signature area. Thus, table 610 may include RSRP measurement fields 615 and 616 for RSRP measurements corresponding to base stations 110-2 and 110-3, while table 620 may include RSRP measurement fields 614, 615 and 616 for RSRP measurements corresponding to base stations 110-1, 110-2, and 110-3. A variety of entries 618 for each of tables 610 and 620 may be populated using batch data that RSRP data collector 510 receives from RSRP signature client 430 on cooperating UEs 105.

Date field 611 and time field 612 may include a date and time, respectively, that location and RSRP data (e.g., in corresponding entries for location coordinates field 613 and RSRP measurement fields 614-616) were collected by a UE 105. Location coordinates field 613 may include GPS coordinates, latitude and longitude, or another type of location identifier for a UE 105 at the corresponding date/time of date field 611 and time field 612. In one implementation, RSRP data collector 510 may normalize entries for location coordinates field 613 into a standard format. In another implementation, RSRP signature client 430 may be required to provide location coordinates in a standardized format.

RSRP measurement fields 614-616 may include RSRP values detected by UE 105 at the corresponding location in location coordinates field 613. RSRP measurements may be provided, for example, as RSRP integer values (as shown in FIG. 6, ranging, e.g., from 0 to 97) or decibel-milliwatts (dBm) values (e.g., between −144 dBm and −44 dBm).

While FIG. 6 shows two separate tables 610 and 620, in other implementations, signature data 520 may be implemented as a single table or data structure. Additionally, signature data 520 may include different or additional field than those shown in portion 600 of FIG. 6. For example, additional location information (e.g., altitude) or other measured/calculated signal strength data (e.g., RSRQ) may also be included in signature data 520.

Returning to FIG. 5, ML clustering module 530 may apply machine learning techniques to associate locations with signal strength values for each signature area (e.g., table 610, 620, etc.) in signature data 520. In one implementation, ML clustering module 530 may apply a clustering technique, such as a k-means clustering algorithm, a density based clustering algorithm (DBSCAN), Agglomerative Hierarchical Clustering, neural networks, or another type of clustering algorithm, to data in each distinct signature area (e.g., tables 610, 620, etc.) to identify clusters based on the observed RSRP strength values. The algorithm may identify a set of M clusters for each signature area, where M can vary between each signature area depending on the number of data points (e.g., entries 618) available. More data points may generally enable a higher number of clusters for more granular location detection.

For each cluster, ML clustering module 530 may create a position estimate. The position estimate can be determined in any of multiple ways. In one example, ML clustering module 530 may average the positions of the data points in a cluster. In another example, ML clustering module 530 may take the position of circles for each data point and create a larger circle (or another area shape) that can cover all data points in that cluster to a degree of confidence (e.g., between 80-90 percent to keep the radius of uncertainty small). Thus, in one implementation, the position estimate of the cluster may be represented as a single location within a cluster. In one implementation, ML clustering module 530 may repeat clustering as new data points become available with the moving time window for signature data 520.

Figure 7:
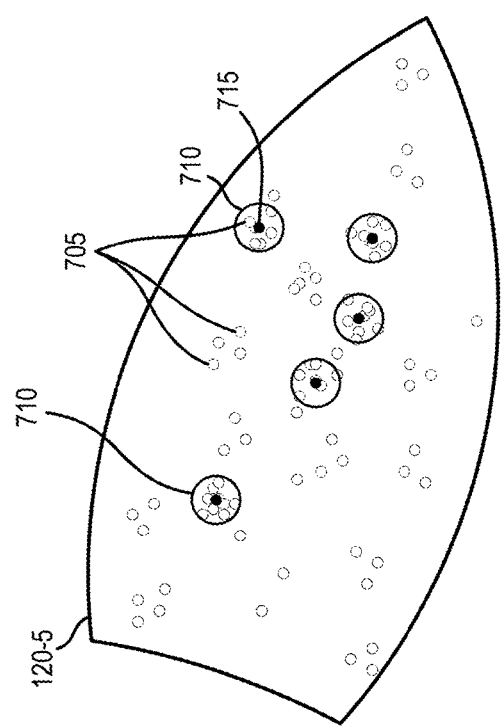
FIG. 7 is a simplified illustration of clustering that may be performed by the ML clustering module of FIG. 5, according to an implementation described herein.

FIG. 7 provides a simplified illustration of clustering that may be performed by ML clustering module 530 for signature area 120-5. Signature area 125 may include multiple data points 705 and clusters 710. Each data point 705 may correspond to a location coordinate (e.g., from entry 618 in table 610) provided by a cooperating UE 105. Although several data points 705 are shown in FIG. 7, in practice, thousands or millions of data points may be included for each signature area. Each data point 705 may be associated with RSRP values for the signature base stations (e.g., for base stations 110-2 and 110-3 in signature area 120-5). ML clustering module 530 may identify clusters 710 based on location and RSRP values for each data point. Each cluster 710 may represent a geographic area associated with a particular combination (or range of combinations) of RSRP values for signals from base stations 110-2 and 110-3. A location value 715 may be assigned to each cluster. Although not shown in FIG. 7, signature data 520 may provide enough data points to allow ML clustering module 530 to calculate clusters 710 covering the entire area of signature area (e.g., signature area 120-5). In one implementation, the size of clusters 710 and position estimates for each cluster (e.g., location values 715) may be configured to support a grid size of about 100 square meters or smaller although any grid size is possible.

Returning to FIG. 5, cluster tables 540 may be generated by ML clustering module 530. Cluster tables 540 may include a listing of the cluster data corresponding to the simplified example of FIG. 7. More particularly, cluster tables 540 may provide a set of RSRP values corresponding to location information 715 of each cluster 710. Thus, for each signature area, cluster tables 540 may provide a cross-reference to match an RSRP measurement from a UE 105 with location information 715.

Position estimator 550 may apply RSRP data from a UE 105 to cluster tables 540 to determine a location of the UE. For example, when a UE 105 (any UE) reports the set of visible base stations 110 along with respective RSRP measurements, position estimator 550 uses the set of base stations to identify the current signature area 120 for UE 105. Position estimator 550 then identifies the cluster 710 to which the RSRP signal strengths are closest to. The location information 715 calculated for that cluster 710 is then assumed as the approximate position of UE 105.

Although FIG. 5 shows exemplary logical components of ML-based position estimation platform 230, in other implementations, ML-based position estimation platform 230 may include fewer logical components, different logical components, or additional logical components than depicted in FIG. 5. Additionally or alternatively, one or more logical components of ML-based position estimation platform 230 may perform functions described as being performed by one or more other logical components.

Figure 8:
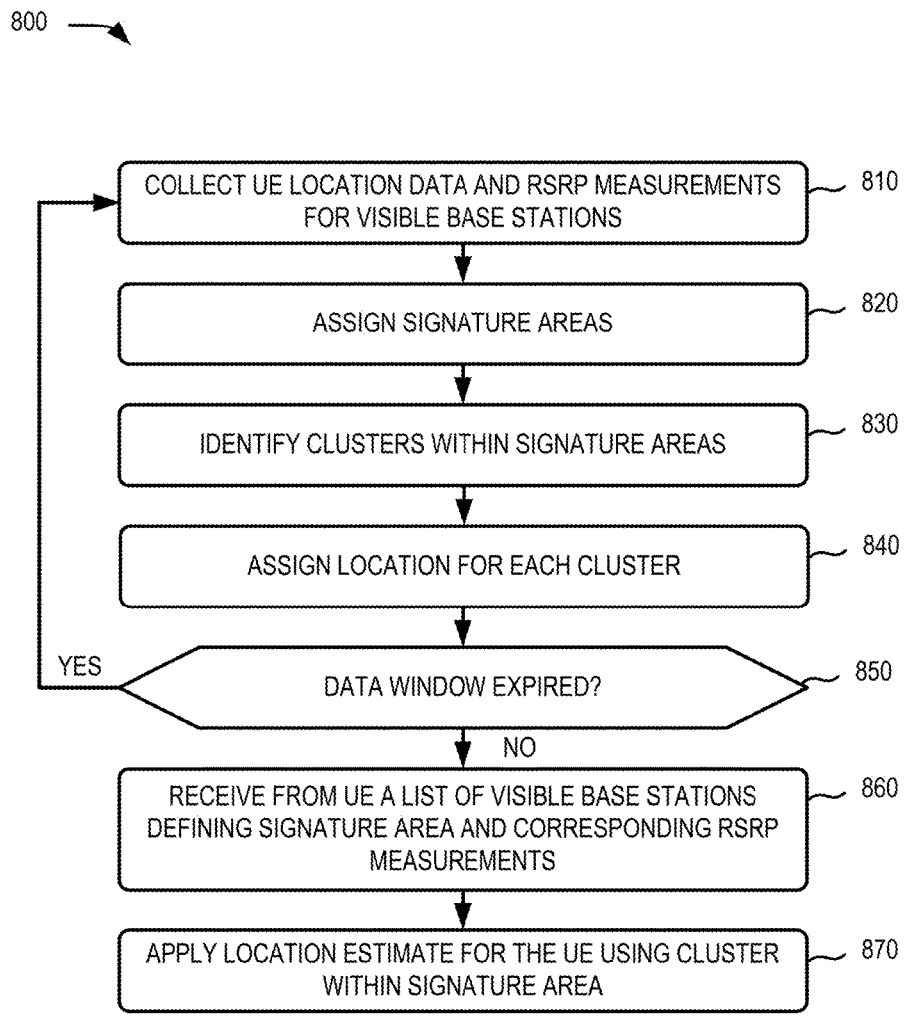
FIG. 8 is a flowchart of an exemplary process for performing RSRP pattern-based location detection, according to an implementation described herein.

FIG. 8 is a flow diagram illustrating an exemplary process 800 for performing RSRP pattern-based location detection, according to an implementation described herein. In one implementation, process 800 may be performed by ML-based position estimation platform 230. In another implementation, some or all of process 800 may be performed by another device or group of devices in network environment 200.

Process 800 may include collecting UE location data and RSRP measurements for visible base stations (block 810) and assigning signature areas (block 820). For example, ML-based position estimation platform 230 may collect UE location indications and corresponding received signal strength measurements for base stations 110 that are concurrently visible to UE devices 105 when at the indicated locations. ML-based position estimation platform 230 may designate signature areas 120 based on groupings of the concurrently visible base stations 110.

Process 800 may also include identifying clusters within the signature areas (block 830) and assigning a location for each of the clusters (block 840). For example, ML-based position estimation platform 230 may identify clusters of geographic data points within the signature areas using machine-learning algorithms to process the large volume of data points generated by UEs 105. ML-based position estimation platform 230 may designate an estimated location for each of the clusters. For example, ML-based position estimation platform 230 may take an average of data point locations within each of the clusters. In another example, ML-based position estimation platform 230 may identify a geographic center of a circle (or another area shape) that covers all data points within a cluster.

Process 800 may further include determining if a data window has expired (block 850). For example, ML-based position estimation platform 230 may apply a time window (e.g., a five-day window, updated daily) to signature data 520. If a portion of the data window has expired based on the applied time window, process 800 may return to block 810 to collect more UE location and RSRP measurements and update the clustering calculations.

If the data window has not expired, process 800 may include receiving from a UE a list of visible base stations and corresponding RSRP measurements (block 860) and applying a location estimate for the UE using a cluster within the signature area (block 870). For example, ML-based position estimation platform 230 may receive, from UE 105, a listing of concurrently visible base stations and corresponding received signal strength measurements. ML-based position estimation platform 230 may provide a location estimate for the UE device by matching the listing to one cluster of the clusters within the signature area. More particularly, ML-based position estimation platform 230 may associate UE device 105 with one of the signature areas 120 based on the concurrently visible base stations 110 in the listing provided by UE 105, and next generate a location estimate for UE device 105 by correlating the corresponding received signal strength measurements from the listing to the previously-collected signal strengths for one of the clusters 710 within the signature area 120.

Figure 9:
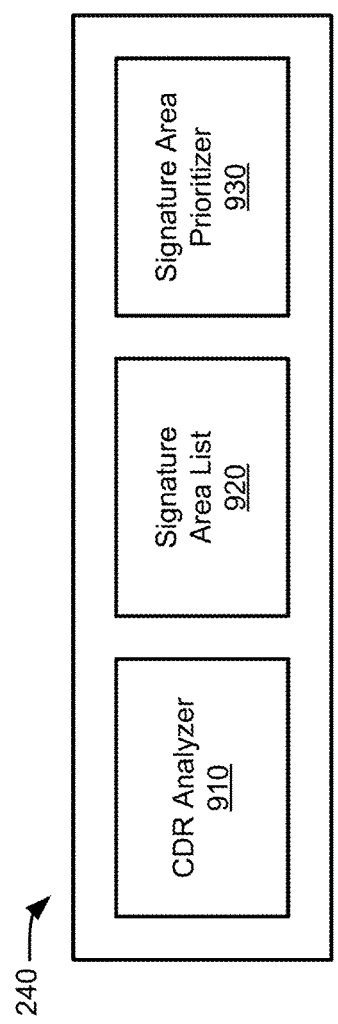
FIG. 9 is a diagram illustrating exemplary logical components of the cell coverage monitoring platform of FIG. 2.

FIG. 9 is a diagram illustrating exemplary logical components of cell coverage monitoring platform 240, according to an implementation described herein. The logical components of cell coverage monitoring platform 240 may be implemented, for example, via processor 320 executing instructions from memory 330. As shown in FIG. 9, cell coverage monitoring platform 240 may include a CDR analyzer 910, a signature area list 920, and a signature area prioritizer 930.

CDR analyzer 910 may evaluate CDR data and/or other data provided to network 210 by base stations 110. CDR analyzer 910 may identify, from the CDRs or other usage records, time periods for scenarios that are indicative of high usage. In one implementation, CDR analyzer 910 may identify time periods for the following two scenarios: (1) time intervals where sustained high traffic is detected at the base station level that utilizes UL and/or DL radio bearers beyond a configurable threshold, and (2) time intervals where the number of active concurrent users are sustained above a configurable threshold. The time intervals for scenario 1 and scenario 2 may be of different durations and different intervals, which may or may not overlap.

CDR analyzer 910 may also extract from the CDR data incremental periods of UL traffic for each signature area 120 (e.g., obtained from signature area list 920). For example, for a configurable time interval, such as a per-second interval, CDR analyzer 910 may extract UL traffic data on a cumulative basis for each unique combination of base stations 110 (e.g., signature areas 120-1 through 120-7) reported by various UEs 105. Additionally, CDR analyzer 910 may extract for each configurable interval (e.g., per-second) the number of concurrent UEs that reported for each signature area 120.

Signature area list 920 may include a listing and corresponding geographic area for signature areas 120. In one implementation, signature area list 920 may be derived from or shared with signature data 520.

Signature area prioritizer 930 may rank signature areas 120 for those most likely to benefit from placement of a small cell. In one implementation, signature area prioritizer 930 may separately prioritize signature areas 120 based on (1) observed traffic throughput and (2) the number of concurrent active UEs observed. For example, for the time intervals identified by CDR analyzer 910, signature area prioritizer 930 may select all signature areas 120 (i.e., all distinct combinations of base stations 110) that contain the specific base station 110 for which high capacity utilization was detected by CDR analyzer 910. Out of the selected signature areas 120, signature area prioritizer 930 may sort (or rank) distinct lists of the signature areas 120 based on (1) traffic throughput observed, in descending order and (2) concurrent UEs observed, in descending order. Signature area prioritizer 930 may identify target locations for small cell/device placement for the top N (e.g., one or more) signature areas from both lists. In one implementation, the number of target locations recommended for small cell/device placement may be relatively small, and improvements and additional small cell/device placement may be achieved through an iterative process.

Figure 10:
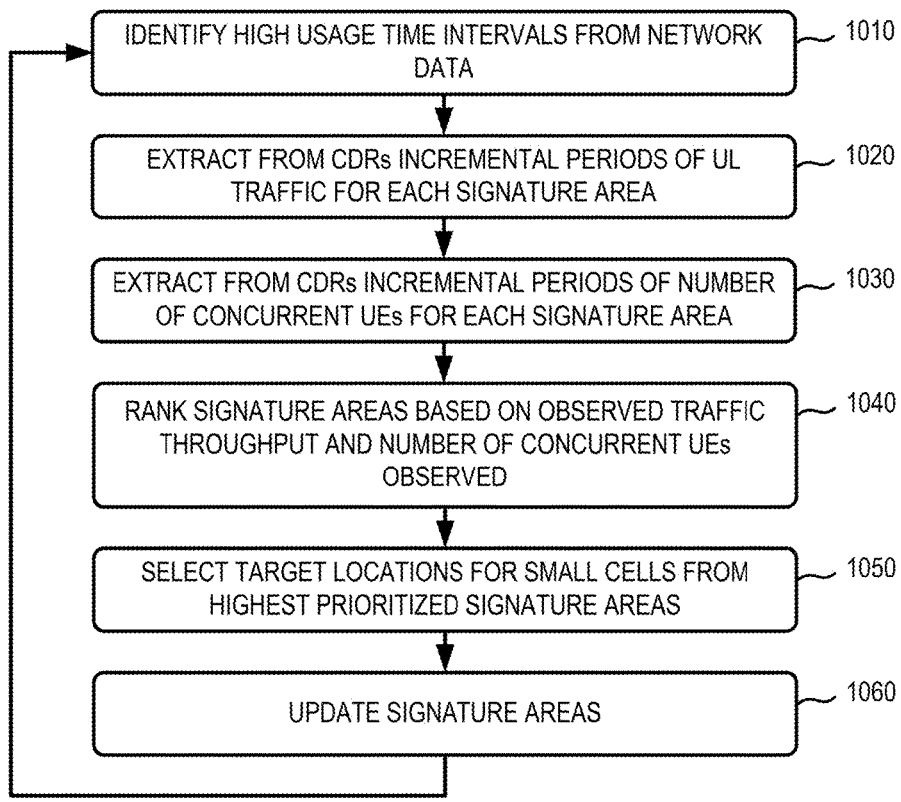
FIG. 10 is a flowchart of a process for identifying placement locations for small cells in a macro cell network environment, according to an implementation described herein.

FIG. 10 is a flow diagram illustrating an exemplary process 1000 for identifying placement locations for small cells in a macro network environment, according to an implementation described herein. In one implementation, process 1000 may be performed by cell coverage monitoring platform 240. In another implementation, some or all of process 1000 may be performed by another device or group of devices in network environment 200.

Process 1000 may include identifying high usage time intervals from network data (block 1010). For example, cell coverage monitoring platform 240 may identify time intervals with high RAN usage from standard network data and/or network feedback systems. In one implementation, cell coverage monitoring platform 240 may identify time intervals where sustained high traffic is detected at base stations 110 that utilizes UL and/or DL radio bearers beyond a configurable threshold (e.g., 60 percent capacity, 80 percent capacity, etc.). Additionally, or alternatively, cell coverage monitoring platform 240 may identify time intervals where the number of active concurrent users (UEs 105) is sustained above a different configurable threshold.

Process 1000 may also include extracting from the CDRs incremental periods of uplink traffic for each signature area (block 1020) and extracting from the CDRs the number of concurrent UEs for each signature area (block 1030). For example, cell coverage monitoring platform 240 may extract from network data (such as CDRs) for the time intervals, UL traffic for each signature area over incremental periods. Cell coverage monitoring platform 240 may also extract from network data (such as CDRs) for the same time intervals, the number of concurrent active UEs for each signature area over the incremental periods. The incremental periods may be every second, every two seconds, every five seconds, etc.

Process 1000 may further include ranking signature areas based on observed traffic throughput and the number of concurrent UEs observed (block 1040). For example, cell coverage monitoring platform 240 may rank lists of the signature areas 120 based on traffic throughput observed and concurrent UEs observed. In one implementation, cell coverage monitoring platform 240 may make a list for ranking traffic throughput observed and a separate list ranking concurrent UEs observed. In another implementation, a single list collectively ranking signature areas based on both traffic throughput observed and concurrent UEs observed may be used.

Process 1000 may additionally include selecting target locations for small cells/devices from highest prioritized signature areas (block 1050), and updating the signature areas (block 1060). For example, cell coverage monitoring platform 240 may identify target locations for small cell/device placement for the top (e.g., one or more) signature areas from both lists. In one implementation, particular placement locations for a small cell may target coverage for the entire signature area 120.

In another implementation, particular placement locations for a small cell may target a particular cluster or gap within a signature area 120 based on concurrent UE location estimates. For example, location estimations for UEs 105 (e.g., using process 800 above) may be compiled as a heat map of concurrent users. The heat map may present a visual (or logical) representation of a concentration of active UEs 105 for a selected time interval. Clusters or areas in the heat map that have few or no concurrent users can be focused on to see if there exists any coverage gaps. This approach can greatly minimize the amount of drive testing by targeting such areas.

According to an implementations described herein, a method is provided for one or more network devices to determine the location of UE devices in a RAN. The method may include collecting UE location indications and corresponding received signal strength measurements for wireless access stations concurrently visible to cooperating UE devices at the indicated locations. Each UE location indication and corresponding received signal strength measurements provide a data point. The method also includes assigning signature areas based on groupings having the same combination of the concurrently visible wireless access stations, identifying multiple clusters of data points within the signature areas, and calculating an estimated location for each cluster based on the UE location indications from the data points. After the designating, the method includes receiving, from a UE device, a listing of concurrently visible wireless access stations and corresponding received signal strength measurements by the other UE device, and generating a location estimate for the other UE device by correlating the concurrently visible wireless access stations and the corresponding received signal strength measurements in the listing to one of the clusters within one of the signature areas.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIGS. 8 and 10, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A method performed by one or more network devices for a radio access network (RAN), the method comprising:
    collecting user equipment (UE) received signal strength measurements for wireless access stations concurrently visible to one or more UE devices;
    designating signature areas based on groupings of the concurrently visible wireless access stations;
    identifying time intervals with RAN usage that exceeds a threshold;
    extracting, from network data for the identified time intervals, uplink traffic for each signature area over incremental periods;
    extracting, from the network data for the identified time intervals, a number of concurrent UEs for each signature area over the incremental periods;
    ranking the signature areas based on the extracted uplink traffic and the extracted number of concurrent UEs; and
    selecting a target signature area for a small cell from the ranked signature areas.

2. The method of claim 1, further comprising:
    updating the ranked signature areas to reflect placement of the small cell.

3. The method of claim 1, wherein identifying the time intervals with RAN usage that exceeds the threshold includes:
    identifying first time intervals where sustained high traffic is detected at an eNB level that utilizes uplink and/or downlink radio bearers beyond a configurable threshold, and identifying second time intervals where a number of active concurrent users is sustained above another configurable threshold.

4. The method of claim 1, wherein the network data includes call detail records (CDRs).

5. The method of claim 1, wherein collecting the UE received signal strength measurements includes:
    receiving, from the one or more UE devices, batch files with reference signal received power (RSRP) measurements.

6. The method of claim 1, wherein each UE received signal strength measurement provides a data point for a corresponding location, and wherein the designating further comprises:
    assigning the signature areas to geographic spaces having data points with the same combination of the concurrently visible wireless access stations.

7. The method of claim 6, wherein the designating further comprises:

identifying multiple clusters of the data points in the signature areas; and calculating an estimated location for each cluster of the multiple clusters based on the UE location indications from the data points.

8. The method of claim 1, wherein the selecting further comprises:

assembling, for the target signature area, a heat map that includes a visual or logical representation of a concentration of active UEs for one or more of the incremental periods.

9. The method of claim 8, wherein the selecting further comprises:

identifying, from the heat map, coverage gaps based on areas that have few or no concurrent users.

10. A network device, comprising:

an interface that communicates with a network;

a memory configured to store instructions; and a processor, coupled to the interface and the memory, wherein the processor is configured to execute the instructions stored in the memory to:

collect user equipment (UE) received signal strength measurements for wireless access stations concurrently visible to one or more UE devices;

designate signature areas based on groupings of the concurrently visible wireless access stations;

identify time intervals with RAN usage that exceeds a threshold;

extract, from network data for the identified time intervals, traffic data for each signature area over incremental periods;

extract, from the network data for the identified time intervals, a number of concurrent UEs for each signature area over the incremental periods;

rank the signature areas based on the extracted uplink traffic and the extracted number of concurrent UEs; and select a target signature area for a small cell from the ranked signature areas.

11. The network device of claim 10, wherein the processor is further configured to:

update the ranked signature areas to reflect a placement of the small cell.

12. The network device of claim 10, wherein, when identifying the time intervals with RAN usage that exceeds the threshold, the processor is further configured to:

identify first time intervals where sustained high traffic is detected at an eNB level that utilizes uplink and/or downlink radio bearers beyond a configurable threshold, or identify second time intervals where a number of active concurrent users is sustained above another configurable threshold.

13. The network device of claim 10, wherein the network data includes call detail records (CDRs).

14. The network device of claim 10, wherein the received signal strength measurements include reference signal received power (RSRP) measurements.

15. The network device of claim 10, wherein the processor is further configured to:

assemble, for the target signature area, a heat map that includes a visual or logical representation of a concentration of active UEs for one or more of the incremental periods.

16. A non-transitory computer-readable medium containing instructions executable by at least one processor, the computer-readable medium comprising one or more instructions to cause the at least one processor to:

collect user equipment (UE) received signal strength measurements for wireless access stations concurrently visible to one or more UE devices;

designate signature areas based on groupings of the concurrently visible wireless access stations;

identify time intervals with RAN usage that exceeds a threshold;

extract, from network data for the identified time intervals, traffic for each signature area over incremental periods or a number of concurrently connected UEs for each signature area over the incremental periods;

rank the signature areas based on the extracted uplink traffic or the extracted number of concurrent UEs; and select a target signature area for a small cell from the ranked signature areas.

17. The non-transitory computer-readable medium of claim 16, further comprising one or more instructions to cause the at least one processor to:

re-designate the ranked signature areas to reflect a placement of the small cell.

18. The non-transitory computer-readable medium of claim 16, wherein the received signal strength measurements include reference signal received power (RSRP), reference signal received quality (RSRQ), or received signal strength indicator (RSSI) data.

19. The non-transitory computer-readable medium of claim 16, wherein the network data includes uplink traffic data from call detail records (CDRs).

20. The non-transitory computer-readable medium of claim 16, wherein the incremental periods include periods of less than five seconds.

* * * * *